US006800953B2

(12) United States Patent
Blackburn et al.

(10) Patent No.: US 6,800,953 B2
(45) Date of Patent: Oct. 5, 2004

(54) ENGINE STARTING APPARATUS AND METHOD FOR CONTROLLING THE SAME

(75) Inventors: Scott Evart Blackburn, Temperance, MI (US); Eric Keith Manning, Toledo, OH (US)

(73) Assignee: Dana Corporation, Toledo, OH (US)

( * ) Notice: Subject to any disclaimer, the term of this patent is extended or adjusted under 35 U.S.C. 154(b) by 125 days.

(21) Appl. No.: 10/290,154

(22) Filed: Nov. 8, 2002

(65) Prior Publication Data

US 2004/0090071 A1 May 13, 2004

(51) Int. Cl.[7] .................................................. H02P 1/00
(52) U.S. Cl. ..................... 290/37 A; 290/31; 290/40 A; 322/14
(58) Field of Search ............................ 290/40 R, 40 A, 290/31, 37 A; 322/14, 15; 180/65.1

(56) References Cited

U.S. PATENT DOCUMENTS

| | | | | |
|---|---|---|---|---|
| 3,902,073 A | | 8/1975 | Lafuze | 290/46 |
| 3,908,161 A | | 9/1975 | Messenger | 322/29 |
| 4,122,354 A | | 10/1978 | Howland | 290/31 |
| 4,481,459 A | | 11/1984 | Mehl et al. | 322/10 |
| 5,650,713 A | * | 7/1997 | Takeuchi et al. | 322/16 |
| 5,818,116 A | * | 10/1998 | Nakae et al. | 290/38 R |
| 5,865,263 A | | 2/1999 | Yamaguchi et al. | 180/65.2 |
| 6,005,297 A | * | 12/1999 | Sasaki et al. | 290/4 C |
| 6,018,198 A | * | 1/2000 | Tsuzuki et al. | 290/17 |
| 6,153,942 A | | 11/2000 | Roseman et al. | 290/47 |
| 6,177,734 B1 | * | 1/2001 | Masberg et al. | 290/31 |
| 6,274,943 B1 | * | 8/2001 | Hasegawa et al. | 290/40 C |
| 6,365,983 B1 | * | 4/2002 | Masberg et al. | 290/40 C |
| 6,396,165 B1 | * | 5/2002 | Nagano et al. | 307/10.6 |
| 6,492,741 B1 | * | 12/2002 | Morimoto et al. | 290/40 C |
| 6,504,259 B1 | * | 1/2003 | Kuroda et al. | 290/40 C |
| 6,593,713 B2 | * | 7/2003 | Morimoto et al. | 318/139 |

* cited by examiner

*Primary Examiner*—Nicholas Ponomarenko
(74) *Attorney, Agent, or Firm*—Liniak, Berenato & White

(57) ABSTRACT

A starting apparatus for an internal combustion engine comprises a starter/alternator assembly operatively coupled to the engine and capable of being operated in a starter mode for starting the engine and in a generator mode for generating electric power when driven by the engine. The starter/alternator assembly includes a starter/alternator machine drivingly connected to the engine, an inverter provided for controlling an output of the starter/alternator machine to selectively choose either the starting mode or the generation mode, and a starter/alternator speed sensor for monitoring a rotational speed of a rotor of the starter/alternator machine that is electrically connected to the starter/alternator inverter. A method of controlling the engine starting apparatus controls transition of the starter/alternator assembly from the starter mode to the generator mode in response to the rotational speed of the starter/alternator machine directly sensed by the starter/alternator speed sensor.

11 Claims, 4 Drawing Sheets

ENGINE STARTING APPARATUS AND METHOD FOR CONTROLLING THE SAME

BACKGROUND OF THE INVENTION

1. Field of the Invention

The present invention relates in general to the field of automotive electrical systems. Specifically, the present invention is directed to a starting apparatus of an internal combustion engine including a starter/alternator assembly and a method for controlling transition of the starter/alternator assembly from a starting mode to a generation mode by monitoring a rotational speed of the starter/alternator assembly.

2. Description of the Prior Art

A recent trend in automotive electrical systems is the combining of the formerly separately functioning and operating starter and alternator/generator components. As automobiles become more electronics intensive, in terms of electronic accessories and sophistication of control systems, the need becomes greater for increased electrical supply. As a result, the alternator has become physically larger and more powerful as automotive electrical needs have increased.

In addition, the need for increasing operating efficiencies from internal combustion (I.C.) engines mandates a powerful and frequently operated starter motor to resume I.C. engine operation on short demand cycles. And, while these separate trends have been in place, a third element always present in automotive design is packaging efficiency in terms of under-hood space. As these trends have progressed, a commonly proposed strategy is to combine the starter and alternator/generator into a single under-hood starter/alternator assembly. During initial startup of the vehicle, the starter/alternator assembly functions as a starter. While functioning as a starter, the starter/alternator assembly provides a sufficient amount of torque to rotate the crankshaft of the engine before the cylinders are fired. After the engine is started, the starter/alternator assembly is used as a generator to provide electric power to the electrical system of the vehicle.

In this regard, the starter function of the starter/alternator assembly can be quite powerful vis-à-vis the I.C. engine being started inasmuch as the I.C. engine is required to achieve self-sustaining operation within ½ to 1 second of starter initiation and require significant demand of the battery. Furthermore, because of the increased demand of vehicle electrical systems, the capacity of the alternator is large and may generate substantial current during generation mode. The generator function of the starter/alternator assembly can be equally powerful vis-à-vis the capacity of the I.C. engine to generate sufficient torque especially during instances of high relative load and low relative engine speed.

In the above-described engine starting or cranking operation, it is desired to crank the engine with as large torque as possible to speedily start the engine by overcoming its large load resistance including static friction at the time of initial period of engine starting.

In the last period of engine starting after the engine is started to rotate, the engine starts to produce a driving torque and frictions at various friction surfaces in the engine changes from the static one to the dynamic one to reduce the load resistance. As a result, the rotational speed of the engine increases rapidly and large vibrations and noises are generated, thus degrading quietness and durability of the engine. Further, applying a large torque from the starter/alternator assembly to the engine to rapidly increase its rotational speed after the starting of engine rotation causes unnecessary consumption of electric power in a vehicle-mounted storage battery.

SUMMARY OF THE INVENTION

The present invention provides a novel arrangement of an apparatus and method for controlling a starter/alternator assembly of an internal combustion engine of a motor vehicle.

The present invention is directed to solving at least one of the potential problems associated with the trend towards combined starter and alternator functions and short demand cycle internal combustion (I.C.) engine operation of a motor vehicle. Specifically, the present invention provides a novel arrangement of an apparatus for starting the I.C. engine including a starter/alternator assembly, and a method for controlling the engine starting apparatus.

The apparatus for starting the I.C. engine in the motor vehicle, in accordance with the present invention, comprises a starter/alternator assembly operatively coupled to the engine and capable of being operated in a starter mode for starting the I.C. engine and in a generator mode for generating electric power when driven by the engine for supplying electrical power to an electrical load equipment. The starter/alternator assembly, in turn, includes a starter/alternator machine drivingly connected to the I.C. engine, an inverter provided for controlling an output of the starter/alternator machine to selectively choose either the starting mode or the generation mode for the starter/alternator machine, and an electronic controller provided for controlling the starter/alternator assembly. The starting apparatus further comprises a starter/alternator speed sensor for monitoring a rotational speed of the starter/alternator, which is electrically connected to the inverter of the starter/alternator. The starter/alternator speed is sensed directly from a rotation and/or position sensor mounted to the starter/alternator for monitoring a rotational speed of a rotor of the starter/alternator machine.

The method of the present invention controls transition of the starter/alternator assembly from the starter mode to a generator mode in response to the rotational speed of the starter/alternator directly sensed by the starter/alternator speed sensor.

In accordance with the first embodiment of the present invention, the electronic controller of the inverter produces an engine cranking indicative signal if the starter/alternator speed decreases. Then, if the starter/alternator speed increases after the engine cranking indicative signal was produced, the starter/alternator inverter produces an engine start indicative signal, and the controller instructs the starter/alternator inverter to disable the starter mode of the starter/alternator assembly in response to the engine start indicative signal. Finally, the controller instructs the starter/alternator inverter to enable the generator mode of the starter/alternator assembly.

In accordance with the second embodiment of the present invention, the inverter controller produces an engine cranking indicative signal when the starter/alternator speed reaches a first threshold value. Then, when the starter/alternator speed decreases to a second threshold value, the inverter controller produces an engine start indicative signal if the engine cranking indicative signal was already produced. Next, the inverter controller instructs the starter/alternator inverter to disable the starter mode of the starter/ alternator assembly if the starter/alternator speed reaches a third threshold value after the engine start indicative signal was produced. Finally, the inverter controller instructs the starter/alternator inverter to enable the generator mode of the starter/alternator assembly.

The novel arrangement of an apparatus and method for controlling a starter/alternator assembly of an internal combustion engine of a motor vehicle in accordance with the present invention is effective to reduce engine vibration and noise, improve durability of the I.C. engine and the starter/alternator assembly, and quickly restore capacity of an electric storage battery.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
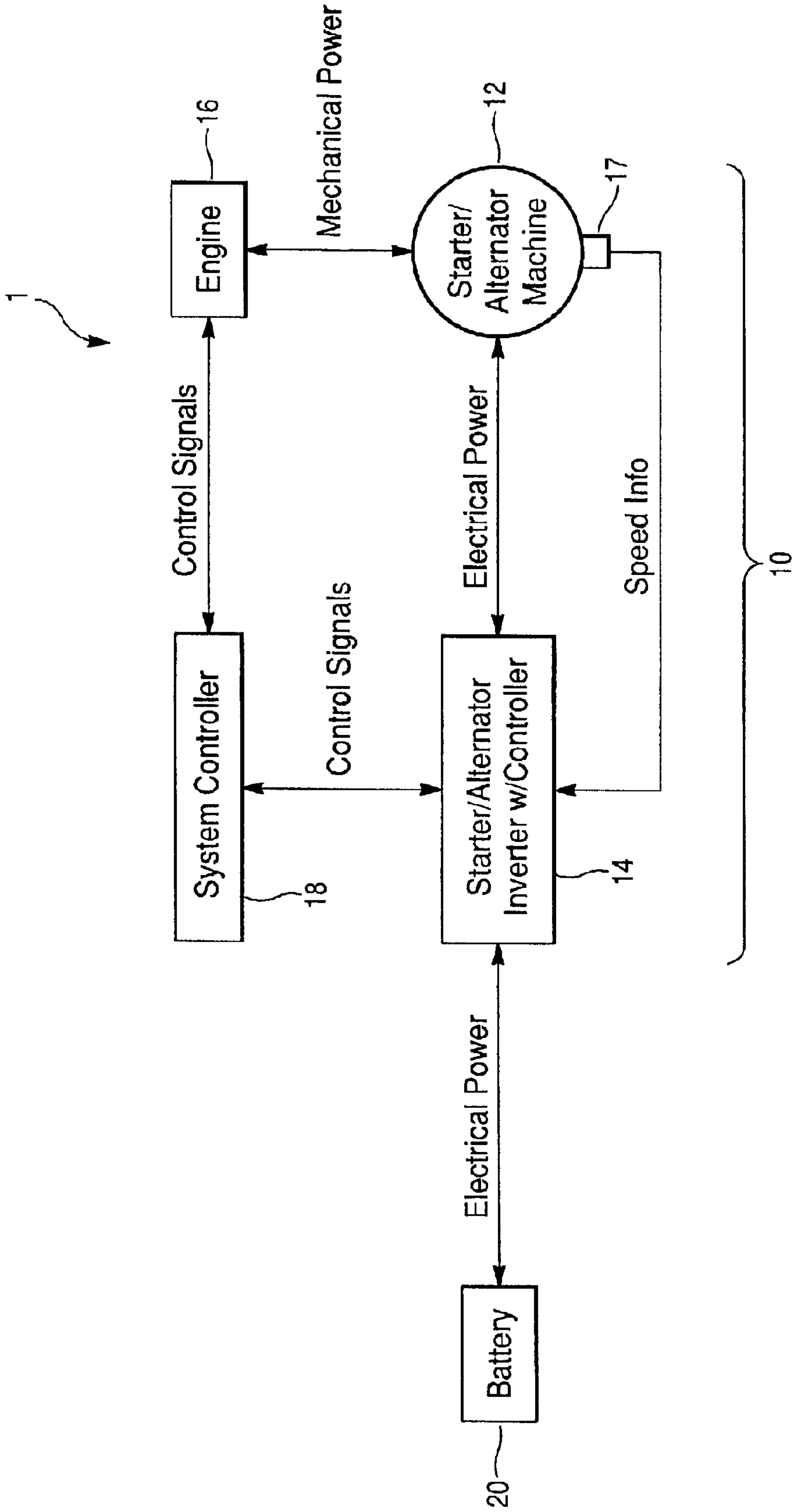
FIG. 1 is a block diagram of a starting apparatus of an internal combustion engine of a motor vehicle in accordance with the preferred embodiment of the present invention.

Referring now to FIG. 1 of the drawings, a starting apparatus of an internal combustion engine of a motor vehicle, generally designated by the reference numeral 1, is illustrated. The starting apparatus 1 comprises a starter/alternator assembly 10 associated with an internal combustion (I.C.) engine 16 mounted to a motor vehicle (not shown), a system controller 18, and an electric storage battery 20. The starter/alternator assembly 10 includes a starter/alternator machine 12 and a starter/alternator inverter 14 having an associated inverter controller. The starter/alternator inverter 14 controls an output of the starter/alternator machine 12 to selectively choose either a starting mode or a generation mode for the starter/alternator machine 12.

The starter/alternator machine 12 is drivingly coupled to a crankshaft of the I.C. engine 16. It will be appreciated by those skilled in the art that the starter/alternator machine 12 may be an integrated unit, i.e., in combination with a crankshaft mounted flywheel or balancer, or a separate belt, chain, or gear driven/driving unit. In any configuration, the starter/alternator assembly 10 is used to start the I.C. engine according to a predetermined instruction, i.e., operator or accessory load demand, and is also used to provide electrical power for either immediate consumption or for storage, i.e., charging the battery 20.

Preferably, the starter/alternator machine 12 is of a switched reluctance type with the inverter 14 provided for controlling the output of the starter/alternator machine 12 to selectively choose the mode of operation of the starter/alternator machine 12, and an electronic system controller 18 provided for controlling the starter/alternator assembly 10. However, other appropriate types of electromagnetic machine are within the scope of the present invention. In operation, two distinct modes of operation of the starter/alternator machine 12 are present: the starter mode and the generator mode.

The starter/alternator inverter 14 is so designed as to control switching timings in inverter circuit for thereby switching operation mode of the starter/alternator machine 12 between the starter mode and the generator mode and to control switching on and off energization current. This is known well in the art and no further description will be made for brevity. It will be understood that, by this control, the starter/alternator machine 12 is conditioned to the starter mode and the generator mode to thereby apply and receive torque to and from the I.C. engine 16 and to thereby receive and supply electric power from and to the storage battery 20, respectively.

The starter/alternator machine 12 is equipped with a starter/alternator speed sensor 17 for directly determining and monitoring a rotational speed $N_R$ of the starter/alternator machine 12 (or starter/alternator speed $N_R$). Preferably, the starter/alternator speed $N_R$ is sensed directly from a rotation and/or position sensor mounted to the starter/alternator assembly 10 for monitoring a rotational speed of a rotor of the starter/alternator machine 12.

In accordance with the present invention, a speed signal from the speed sensor 17 representing value of the starter/alternator speed $N_R$ is provided to the starter/alternator inverter 14 for engine starting control. The system controller 18 likewise receives and transmits operational information to and from the I.C. engine 16 and the starter/alternator inverter 14 to selectively choose either the starter mode or the generator mode. It will be appreciated by those skilled in the art that the system controller 18 customarily includes an ECU (Electronic Control Unit) and ROM (Read Only Memory) and other circuit devices. The battery 20 provides an electrical power to activate the starter/alternator assembly 10 when the starter mode is selected. The I.C. engine 16 is also equipped with various engine driven accessories (not shown), such as a cooling fan, an A/C installation, a power steering pump, a water pump, an emissions pumps, a camshaft, etc.

In operation, the starter/alternator inverter 14 monitors the starter/alternator speed $N_R$ from the speed sensor 17.

Figure 2:
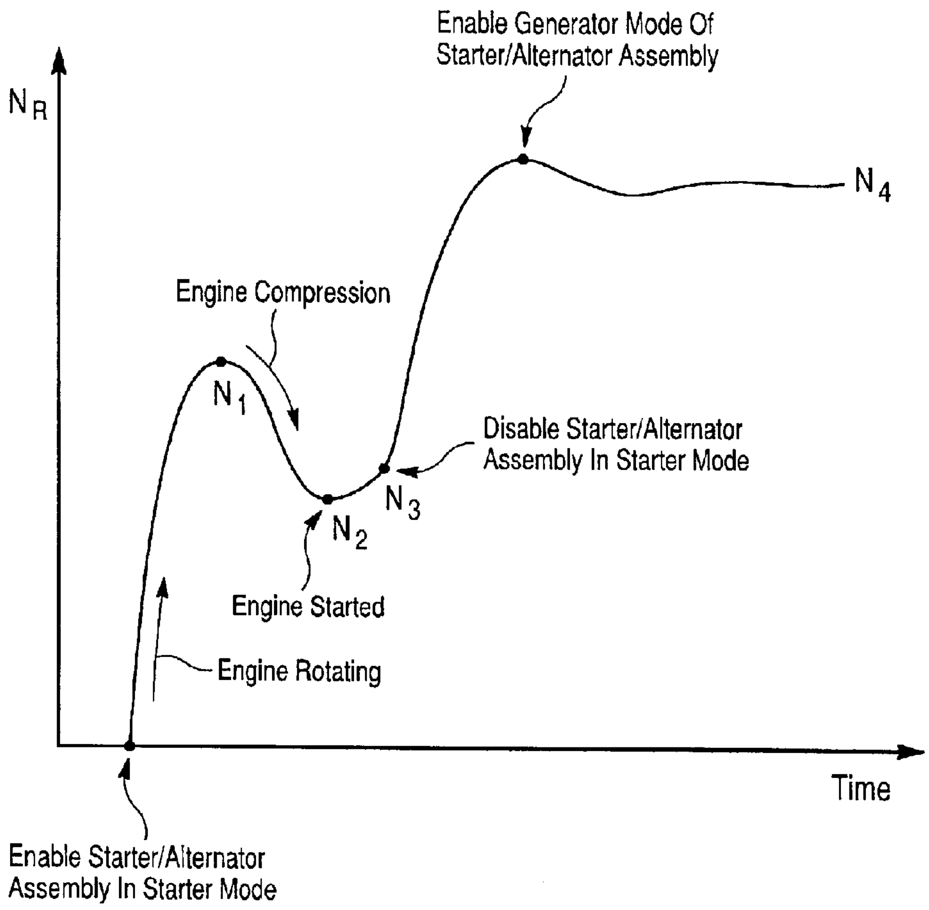
FIG. 2 is a plot of a starter/alternator speed versus time for various operating modes of a starter/alternator assembly.

Operation of the above embodiment primarily performed by the starter/alternator inverter 14 and the system controller 18 will be described in detail with further reference to the plot in FIG. 2.

An engine start sequence is initiated by enabling the starter mode of the starter/alternator assembly 10 by energizing the starter/alternator machine 12 in the starter mode and starts monitoring the rotational speed $N_R$ thereof. At this instance, the starter/alternator machine 12 starts rotating the internal combustion engine 16. As illustrated in the plot in FIG. 2, first, the rotational speed $N_R$ of the starter/alternator machine 12 quickly increases. The initial increase of the starter/alternator speed $N_R$ indicates that the engine 16 started rotating. The rotational speed $N_R$ of the starter/alternator machine 12 reaches a first threshold value $N_1$, then it starts decreasing due to increasing resistance of the engine 16 to the cranking by the starter/alternator machine 12 primarily because of the compression of the air/fuel mixture in cylinders of the I.C. engine 16. This indicates that the compression is occurring in the I.C. engine 16. Thus, an engine cranking indicative signal is produced by the starting apparatus 1.

When the rotational speed $N_R$ of the starter/alternator machine 12 decreases to a second threshold value $N_2$, the I.C. engine 16 starts and the rotational speed $N_R$ of the starter/alternator machine 12 increases again due to the torque applied thereto from the I.C. engine 16, and the starting apparatus 1 produces an engine start indicative signal.

When the rotational speed $N_R$ of the starter/alternator machine 12 reaches a third threshold value $N_3$, the starting apparatus 1 disables the starter mode of the starter/alternator assembly 10. Consequently, the rotational speed $N_R$ of the starter/alternator machine 12 quickly increases due to decreasing of resistance of the starter/alternator machine 12 as the starter mode of the starter/alternator assembly 10 is disabled. Finally, the starting apparatus 1 enables the generator mode of the starter/alternator assembly 10 by energizing the starter/alternator machine 12 in the generator mode. Due to the increased resistance of the starter/alternator machine 12, the rotational speed $N_R$ of the starter/alternator machine 12 is stabilized at a relatively constant speed $N_4$.

Figure 3:
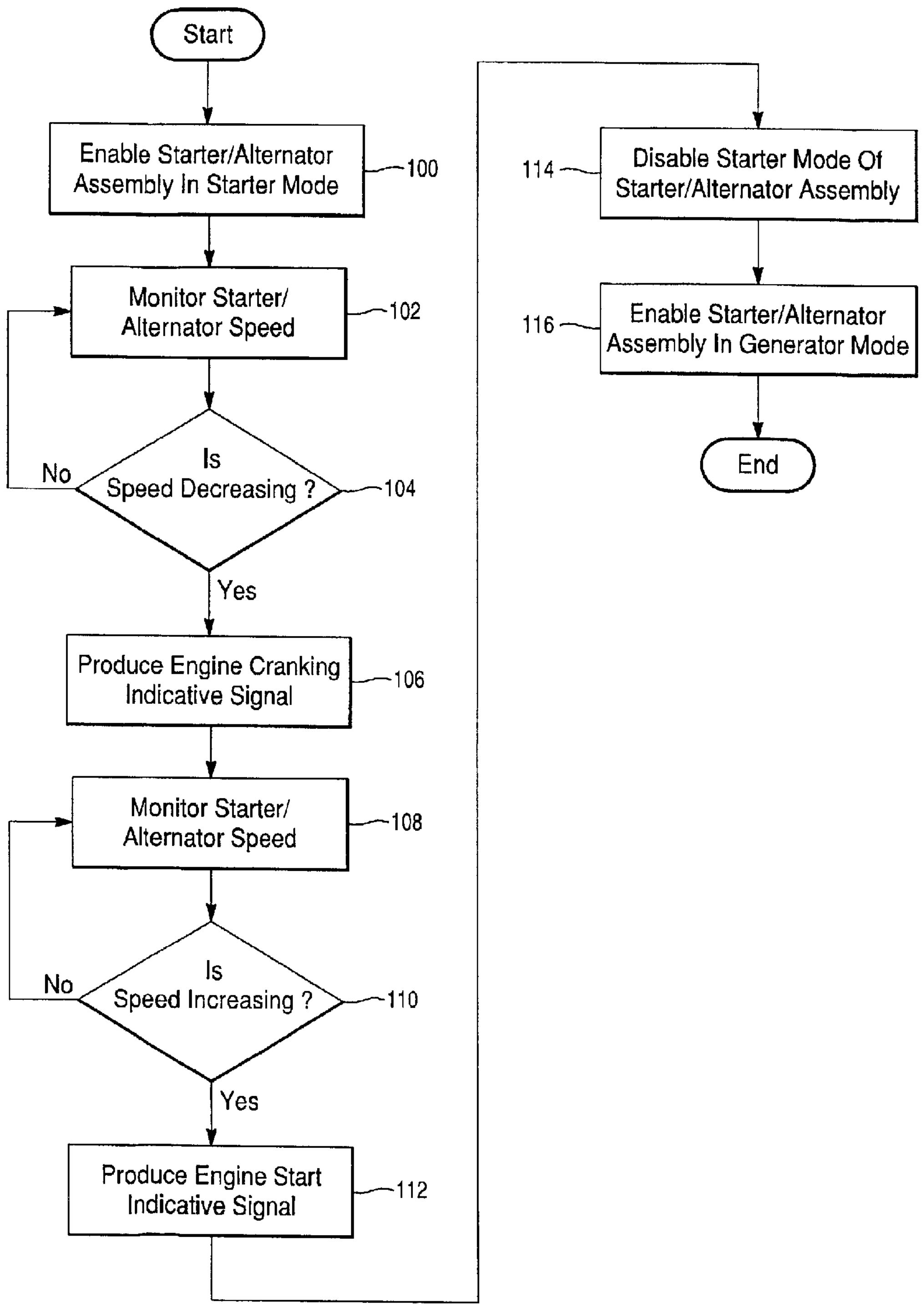
FIG. 3 is a flow chart illustrating the operation of the starting apparatus shown in FIG. 1 to control transition of a starter/alternator assembly from a starting mode to a generation mode in accordance with the first exemplary embodiment of the present invention.

A method for controlling the starting apparatus 1 for the I.C. engine in accordance with the first exemplary embodiment of the present invention will be described in detail with further reference to the flow chart shown in FIG. 3 that represents a block diagram for the logic sequence of the starting apparatus 1.

At step 100, the starting apparatus 1 enables the starter mode of the starter/alternator assembly 10 by energizing the starter/alternator machine 12 in the starter mode. At this instance, the starter/alternator machine 12 starts rotating the internal combustion engine 16, and the rotational speed $N_R$ of the starter/alternator machine 12 increases, as illustrated in FIG. 2.

At step 102, the starting apparatus 1 monitors the rotational speed $N_R$ of the starter/alternator machine 12 directly from the starter/alternator speed sensor 17.

At step 104 it is determined if the rotational speed $N_R$ of the starter/alternator machine 12 is decreasing? If the determination is YES at step 104, it is determined that engine compression is occurring and an engine cranking indicative signal is produced at step 106. Processing returns to the main routine (step 102) if the determination is NO.

If the engine cranking indicative signal is produced, the starting apparatus 1 again monitors the rotational speed $N_R$ of the starter/alternator machine 12 at step 108.

At step 110 it is determined if the rotational speed $N_R$ of the starter/alternator machine 12 is increasing. If the determination is YES at step 104, it is determined that engine has started and an engine start indicative signal is produced at step 112. Processing returns to the main routine (step 108) if the determination is NO.

If the engine start indicative signal is produced, the starting apparatus 1 disables the starter mode of the starter/alternator assembly 10 at step 114 in any known fashion.

Then, at step 116, starting apparatus 1 enables the generator mode of the starter/alternator assembly 10 in any known fashion.

Figure 4:
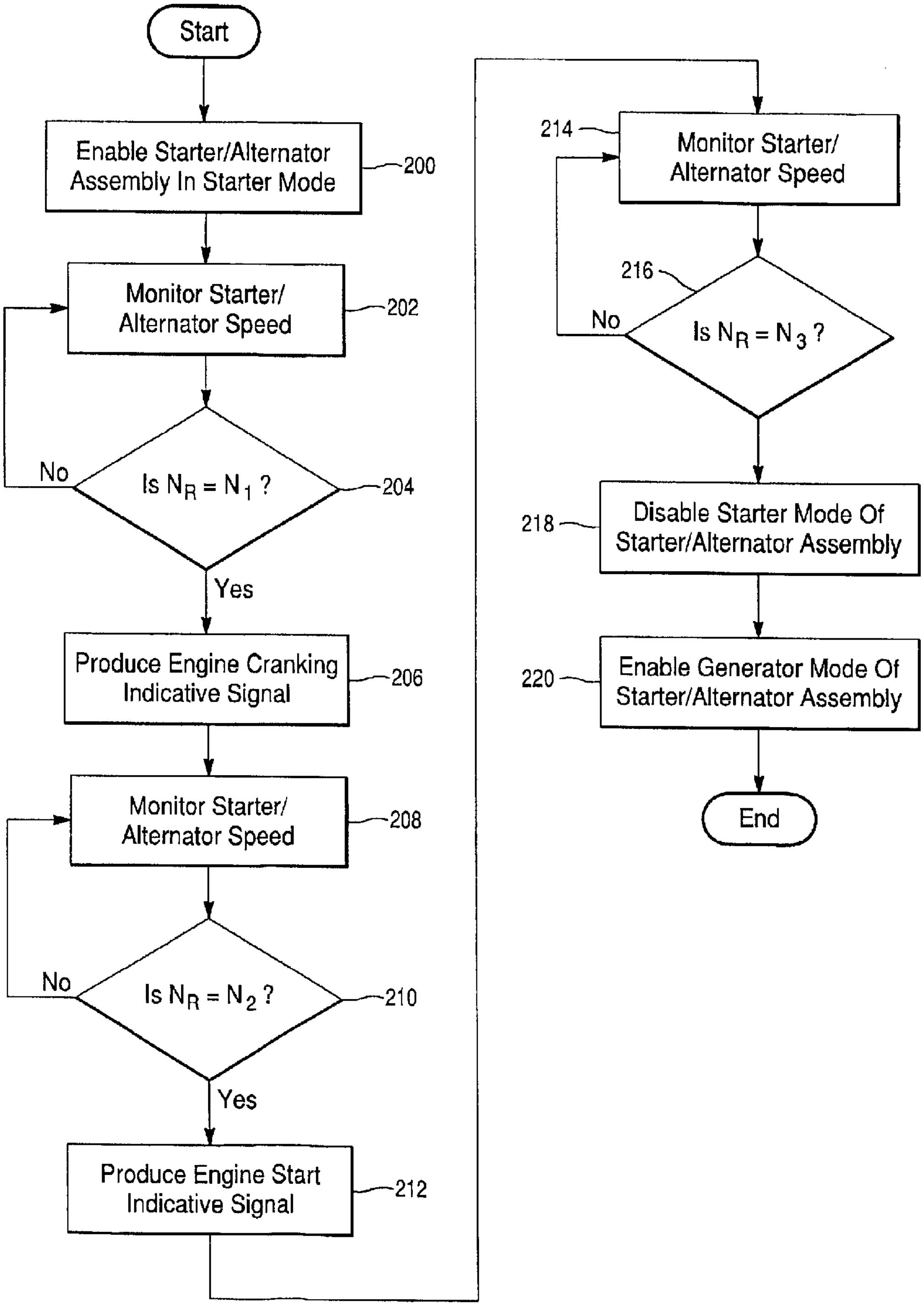
FIG. 4 is a flow chart illustrating the operation of the starting apparatus shown in FIG. 1 to control transition of a starter/alternator assembly from a starting mode to a generation mode in accordance with the second exemplary embodiment of the present invention.

A method for controlling the starting apparatus 1 for the I.C. engine in accordance with the second exemplary embodiment of the present invention will be described in detail with further reference to the flow chart shown in FIG. 4.

At step 200, the starting apparatus 1 enables the starter mode of the starter/alternator assembly 10 by energizing the starter/alternator machine 12 in the starter mode. At this instance, the starter/alternator machine 12 starts rotating the internal combustion engine 16, and the rotational speed $N_R$ of the starter/alternator machine 12 increases, as illustrated in FIG. 2.

At step 202, the system controller 18 of the starting apparatus 1 monitors the rotational speed $N_R$ of the starter/alternator machine 12 directly from the starter/alternator speed sensor 17.

At step 204 it is determined if the rotational speed $N_R$ of the starter/alternator machine 12 has reached a first threshold value $N_1$. If the determination is YES at step 204, an engine cranking indicative signal is produced at step 206. Processing returns to the main routine (step 202) if the determination is NO.

If the engine cranking indicative signal is produced, the system controller 18 of the starting apparatus 1 again monitors the rotational speed $N_R$ of the starter/alternator machine 12 at step 208.

At step 210 it is determined if the rotational speed $N_R$ of the starter/alternator machine 12 has reached a second threshold value $N_2$. If the determination is YES at step 210, it is determined that engine has started and an engine start indicative signal is produced at step 212. Processing returns to the main routine (step 208) if the determination is NO.

If the engine start indicative signal is produced, the starting apparatus 1 again monitors the rotational speed $N_R$ of the starter/alternator machine 12 at step 214.

At step 216 it is determined if the rotational speed $N_R$ of the starter/alternator machine 12 has reached a third threshold value $N_3$. If the determination is YES at step 216, the system controller 18 of the starting apparatus 1 instructs the starter/alternator inverter 14 to disable the starter mode of the starter/alternator assembly 10 at step 218. Processing returns to the main routine (step 214) if the determination is NO.

Then, at step 220, the system controller 18 of the starting apparatus 1 instructs the starter/alternator inverter 14 to enable the generator mode of the starter/alternator assembly 10 in any known fashion.

The foregoing method will improve the performance and overall reliability of the starter/alternator assembly 10 by controlling the transition between the two modes of operation thereof from the starter mode to the generator mode, using the step of monitoring of the starter/alternator speed directly from the starter/alternator speed sensor. In accordance with the method, the starter/alternator assembly is preserved from destructive excessive operation. It is also noted that the threshold speed values could change for different engine and vehicle arrangements. Regardless of design parameters, however, the applied method would follow the necessary detecting and comparison steps according to the predetermined criteria specified for the starter/alternator assembly being used.

It is to be understood that the particular nature of a starter/alternator assembly is significantly different from conventional systems having a conventional starter motor separate from the alternator. It has been shown that present invention of controlling the starter/alternator assembly and transition of the starter/alternator assembly from the starting mode to the generation mode is particularly beneficial in the starter/alternator environment and is efficiently controlled simply by monitoring the rotational speed of the starter/alternator machine. Thus, while the present algorithm may be employed in conventional systems, the additional benefits associated with a starter/alternator arrangement, heretofore not recognized in the prior art, will be appreciated.

While the foregoing invention has been shown and described with reference to preferred embodiments, it will be understood by those possessing skill in the art that various changes and modifications may be made without departing from the spirit and scope of the invention. The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method for controlling a starting apparatus of a combustion engine, said starting apparatus including a starter/alternator assembly capable of being operated in a starter mode for starting said engine and in a generator mode for generating electric power when driven by said engine for supplying electrical power to an electrical load equipment, said starter/alternator assembly including a starter/alternator machine drivingly connected to said engine, said method comprising the steps of:

(a) enabling said starter mode of said starter/alternator assembly;

(b) energizing said starter/alternator assembly in said starter mode;

(c) monitoring a rotational speed of said starter/alternator machine;

(d) producing an engine cranking indicative signal if said speed decreases;

(e) producing an engine start indicative signal if said speed increases after said engine cranking indicative signal was produced; and (f) disabling said starter mode of said starter/alternator assembly if said engine start indicative signal was produced;

(g) enabling said generator mode of said starter/alternator assembly.

2. The method for controlling said starting apparatus of said engine as defined in claim 1, wherein the step of monitoring said rotational speed of said starter/alternator machine is accomplished using a signal directly from a starter/alternator machine speed sensor.

3. An apparatus for starting a combustion engine, said starting apparatus comprising:

an internal combustion engine;

a starter/alternator assembly operatively coupled to said engine and capable of being operated in a starter mode for starting said engine and in a generator mode for generating electric power when driven by said engine for supplying electrical power to an electrical load equipment;

said starter/alternator assembly including a starter/alternator machine drivingly connected to said engine and a starter/alternator inverter for controlling an output of said starter/alternator machine to selectively enable either said starter mode or said generator mode for said starter/alternator machine; and a starter/alternator speed sensor for monitoring a rotational speed of said starter/alternator machine, said starter/alternator speed sensor eclectically connected to said inverter;

wherein said starter/alternator inverter is provided for producing an engine cranking indicative signal if said speed of said starter/alternator machine decreases, producing an engine start indicative signal if said speed of said starter/alternator machine increases after said engine cranking indicative signal was produced, and disabling said starter mode of said starter/alternator assembly in response to said engine start indicative signal;

wherein said starter/alternator inverter is further provided for enabling said generator mode of said starter/alternator assembly after said starter mode of said starter/alternator assembly was disabled.

4. The apparatus for starting said combustion engine as defined in claim 3, wherein said starter/alternator speed sensor monitors a rotational speed of a rotor of said starter/alternator machine.

5. A method for controlling a starting apparatus for an engine, said starting apparatus including a starter/alternator assembly capable of being operated in a starter mode for starting said engine and in a generator mode for generating electric power when driven by said engine for supplying electrical power to an electrical load equipment, said method comprising the steps of:

(a) enabling said starter mode of said starter/alternator assembly;

(b) energizing said starter/alternator assembly in said starter mode;

(c) monitoring a rotational speed of said starter/alternator assembly;

(d) producing an engine cranking indicative signal when said speed reaches a first threshold value;

(e) producing an engine start indicative signal when said speed decreases to a second threshold value if said engine cranking indicative signal was produced; and (f) disabling said starter mode of said starter/alternator assembly if said speed reaches a third threshold value after said engine start indicative signal was produced;

(g) enabling said generator mode of said starter/alternator assembly.

6. The method for controlling said starting apparatus of said engine as defined in claim 5, wherein the step of monitoring said rotational speed of said starter/alternator assembly is accomplished using a signal directly from a starter/alternator speed sensor provided for monitoring a rotational speed of a rotor of said starter/alternator machine.

7. The method for controlling said starting apparatus of said engine as defined in claim 5, wherein said first threshold value is bigger than said second threshold value and said third threshold value is bigger than said second threshold value.

8. The method for controlling said starting apparatus of said engine as defined in claim 7, wherein said first threshold value is bigger than said third threshold value.

9. An apparatus for starting a combustion engine, said starting apparatus comprising:

an internal combustion engine;

a starter/alternator assembly operatively coupled to said engine and capable of being operated in a starter mode for starting said engine and in a generator mode for generating electric power when driven by said engine for supplying electrical power to an electrical load equipment;

said starter/alternator assembly including a starter/alternator machine drivingly connected to said engine and a starter/alternator inverter for controlling an output of said starter/alternator machine to selectively enable either said starter mode or said generator mode for said starter/alternator machine; and a starter/alternator speed sensor for monitoring a rotational speed of said starter/alternator machine, said starter/alternator speed sensor electrically connected to said inverter;

wherein said starter/alternator inverter is provided for producing an engine cranking indicative signal when said speed reaches a first threshold value, producing an engine start indicative signal when said speed decreases to a second threshold value if said engine cranking indicative signal was produced, and disabling said generator mode of said starter/alternator assembly if said speed reaches a third threshold value after said engine start indicative signal was produced;

wherein said starter/alternator inverter is further provided for enabling said generator mode of said starter/alternator assembly after said starter mode of said starter/alternator assembly was disabled.

10. The apparatus for starting said combustion engine as defined in claim 9, wherein said first threshold value is bigger than said second threshold value and said third threshold value is bigger than said second threshold value.

11. The apparatus for starting said combustion engine as defined in claim 9, wherein said starter/alternator speed sensor monitors a rotational speed of a rotor of said starter/alternator machine.

* * * * *